United States Patent
Tanaka et al.

(10) Patent No.: US 6,835,006 B2
(45) Date of Patent: Dec. 28, 2004

(54) LENS BARREL AND CAMERA

(75) Inventors: Yasuhiko Tanaka, Saitama (JP); Kazunori Ishizuka, Kawasaki (JP); Masaaki Orimoto, Asaka (JP); Shigeru Kondo, Asaka (JP)

(73) Assignees: Fuji Photo Optical Co., Ltd., Saitama (JP); Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 10/414,085

(22) Filed: Apr. 16, 2003

(65) Prior Publication Data

US 2003/0219243 A1 Nov. 27, 2003

(30) Foreign Application Priority Data

Apr. 19, 2002 (JP) ........................................ 2002-118147
Jul. 26, 2002 (JP) ........................................ 2002-218138
Mar. 25, 2003 (JP) ........................................ 2003-082209

(51) Int. Cl.$^7$ .............................................. G03B 5/02
(52) U.S. Cl. ........................ 396/349; 396/451; 396/462
(58) Field of Search ................................ 396/348, 349, 396/451, 462

(56) References Cited

U.S. PATENT DOCUMENTS 2,176,679 A * 10/1939 Nerwin ........................ 396/349

FOREIGN PATENT DOCUMENTS

| JP | 06-258702 | 9/1994 |
| JP | 7-295050 | 11/1995 |
| JP | 10-111444 | 4/1998 |
| JP | 10-288731 | 10/1998 |
| JP | 2003-66311 | 3/2003 |
| JP | 2003-121720 | 4/2003 |

* cited by examiner

Primary Examiner—David M. Gray
(74) Attorney, Agent, or Firm—Arnold International; Bruce Y. Arnold

(57) ABSTRACT

There are disclosed a lens barrel variable in a barrel length between a storage state relatively short in a barrel length and an image taking state relatively long in a barrel length, a camera having such a lens barrel. When the lens barrel is in the storage state, an opening of a lens shutter is opened to enter lens groups into the opening.

16 Claims, 17 Drawing Sheets

LENS BARREL AND CAMERA

BACKGROUND OF THE INVENTION

1. Field of the Invention

The present invention relates to a lens barrel which is variable in a barrel length between a storage state relatively short in a barrel length and an image taking state relatively long in a barrel length, and a camera having such a lens barrel.

2. Description of the Related Art

Hitherto, such a type of camera that photography is performed on a silver halide film comes into wide use. And recently, in addition to such a type of camera, there rapidly comes into wide use an electronic camera in which a subject is image-formed on a solid state imaging device such as a CCD imaging device to derive image data representative of the subject. The camera of such a type that photography is performed on a silver halide film and the electronic camera as mentioned above are simply referred to as a "camera".

Generally, a camera requires a high order of portability. And thus there is widely used a collapse and extension type of lens barrel arranged in such a manner that a lens barrel holding an image taking lens is collapsed into a camera body side when the camera is not used, and the lens barrel projects from the camera body side ahead when photograph is performed. Also in the conventional so called-compact camera and the recent electronic camera, there are widely used a lens shutter and an aperture disposed between image taking lenses.

In the lens barrel variable in collapse and extension and a camera provided with the lens shutter and the aperture, as mentioned above, it is a problem as to how the portability is improved.

In this case, as one of points contributing to an improvement of the portability, there may be raised thinness of a lens barrel at the time of collapse in an optical axis direction.

FIG. 17 is a sectional view of a lens barrel of the conventional camera at the time of collapse taken along optical axis S.

FIG. 17 shows a collapse and extension type of lens barrel 10. The lens barrel 10 comprises an image taking lens 20 consisting of a first group lens 21, a second group lens 22 and a third group lens 23, and a lens shutter 30 disposed between the first group lens 21 and the second group lens 22 of the image taking lens 20. The lens barrel 10 is of a zoom lens structure capable of adjusting a focal length at the time of extension as well as permission of collapse and extension. At the rear portion of the lens barrel 10, there is disposed a CCD imaging device 40 which is fixed on a camera body side. That is, here, there is shown a lens barrel 10 for an electronic camera.

As shown in FIG. 17, of the lens groups constituting the image taking lens 20, the second group lens 22 and the third group lens 23 are disposed at mutually very closed positions in the collapsed state shown in FIG. 17. However, between the first group lens 21 and the second group lens 22, there is the lens shutter 30, and thus the first group lens 21 and the second group lens 22 are disposed away from one another to some extent putting the lens shutter 30 therebetween. This makes it impossible to reduce the size of the lens barrel at the time of the collapse.

For example, Japanese Patent Laid Open Gazette Hei. 6-258702 discloses a camera in which a photographic optical system of a single focal point comprising a plurality of lens groups is movable between an initial position for a photography and a collapsed position saved from the initial position to a camera main body side, wherein the camera has a mechanism that when the photographic optical system is moved to the collapsed position, the plurality of lens groups is reduced in interval among the lens groups as compared with that of the initial position so that the length of occupation of the photographic optical system is altered.

Further Japanese Patent Laid Open Gazette Hei. 10-288731 discloses a zoom lens, which is miniaturized by improvement of an aperture driving mechanism. However, this is not to solve the problems of the aperture and the shutter per se. And thus, there is a limit of miniaturization.

SUMMARY OF THE INVENTION

In view of the foregoing, it is an object of the present invention to provide a lens barrel capable of reducing a size (a barrel length) in an optical axis direction as compared with the conventional lens barrel which is variable in a barrel length between a collapsing state and an extension state, and also provide a camera provided with such a lens barrel.

To achieve the above-mentioned objects, the present invention provides a lens barrel which is variable in a barrel length between a storage state relatively short in a barrel length and an image taking state relatively long in a barrel length, wherein the lens barrel incorporates therein a image taking lens consisting of a plurality of lens groups, the lens barrel comprising:

a light quantity control member which is in a use state that a light quantity of a photographic light passing through the image taking lens is controlled, when the lens barrel is in the image taking state, and which is in a non-use state that an opening is kept on a predetermined aperture size; and a lens movement mechanism that moves at least part of members constituting any lens group of the plurality of lens groups constituting the image taking lens to a state that the part comes into the opening of the light quantity control member, when the lens barrel moves from the image taking state to the storage state.

In the lens barrel according to the present invention as mentioned above, it is acceptable that the light quantity control member is a lens shutter or an aperture member. Alternatively, it is acceptable that the light quantity control member is a member used both as a lens shutter and an aperture member.

According to the lens barrel of the present invention, at least part of members constituting any lens group of the plurality of lens groups constituting the image taking lens is moved to a state that the part comes into the opening of the light quantity control member, when the lens barrel moves from the image taking state to the storage state. This feature makes it possible to reduce the barrel length in the storage state as compared with the conventional one.

In the lens barrel according to the present invention as mentioned above, it is preferable that when the light quantity control member is in the non-use state, the light quantity control member maintains the opening in an opening state that the opening is opened more than a maximum aperture in the use state.

There is a need to determine the maximum aperture in the image taking state from the viewpoint of the image taking efficiency. The size of the maximum aperture in the image taking state is not always an aperture size sufficient for accommodating at least part of members constituting any lens group of the plurality of lens groups in the opening of the light quantity control member, at the time of the storage state. In this case, when the lens barrel is in the storage state, the light quantity control member maintains the opening in an opening state that the opening is opened more than a maximum aperture in the image taking state. Thus, it is possible to satisfy both the image taking ability and the storage ability.

In the lens barrel according to the present invention as mentioned above, it is preferable that the lens barrel further comprises a compulsory changing over member that forcibly changes over the light quantity control member to the non-use state, before the part is in contact with the light quantity control member, when the lens barrel moves from the image taking state to the storage state.

Even if a malfunction of the lens control system or a mechanical shock in operation bring about an approach of the lens groups to the light quantity control member, the presence of the compulsory changing over member makes it possible to avoid a mechanical destroy of the lens barrel since the light quantity control member moves to the non-use state.

In the lens barrel according to the present invention as mentioned above, it is preferable that the compulsory changing over member is a rod-like shaped member projecting toward the light quantity control member provided on a side of the lens groups, and the light quantity control member is in contact with the compulsory changing over member, before the part is in contact with the light quantity control member, when the lens barrel moves from the image taking state to the storage state, so that the light quantity control member changes over to the non-use state upon receipt of a driving force wherein the lens barrel moves to the storage state, via the compulsory changing over member.

The use of the rod-like shaped member makes it possible to avoid a possibility that the lens groups are in contact with the light quantity control member, and also possible to readily change over the light quantity control member to the non-use state in accordance with the movement of the lens barrel to the storage state.

In the lens barrel according to the present invention as mentioned above, it is preferable that the lens barrel further comprises control means that maintains the non-use state wherein the light quantity control member withdraws to a predetermined withdrawal position, when the lens barrel is in the storage state, and controls an approach of the lens groups to the light quantity control member in an optical axis direction, when the light quantity control member is in a non-withdrawal position.

In the lens barrel according to the present invention as mentioned above, it is acceptable that the control means comprises an engagement member provided on a side of the lens groups, and a control member that comes into a movement path for the engagement member from out of the movement path in connection with a movement of the light quantity control member from the withdrawal position to the non-withdrawal position, and the control member is constructed in such a manner that before at least part of the lens groups is in contact with the light quantity control member at the non-withdrawal position, the control member is in contact with the engagement member to prevent contact of the part with the light quantity control member.

In the lens barrel according to the present invention as mentioned above, it is acceptable that the light quantity control member consists of an aperture blade, and the control member is constructed in united body with the aperture blade.

It is acceptable that there is provided such an arrangement that the control member withdraws from inside a movement path for the engagement member to outside the movement path at the time of the shutter open in connection with a movement of the shutter blade.

To achieve the above-mentioned objects, the present invention provides a camera having a lens barrel that holds a image taking lens consisting of a plurality of lens groups, and a light quantity control member for controlling an amount of light passing through the image taking lens, the lens barrel being variable in a barrel length between a storage state relatively short in a barrel length and an image taking state relatively long in a barrel length, wherein a photography is carried out by a photographic light passing through the light quantity control member, wherein the lens barrel maintains at least part of members constituting any lens group of the plurality of lens groups constituting the image taking lens to a state that the part comes into the opening of the light quantity control member, when the lens barrel is in a storage state.

In the camera according to the present invention as mentioned above, it is acceptable that the light quantity control member is a lens shutter or an aperture member. Alternatively, it is acceptable that the light quantity control member is a member used both as a lens shutter and an aperture member.

According to the camera of the present invention as mentioned above, the lens barrel maintains at least part of members constituting any lens group of the plurality of lens groups constituting the image taking lens to a state that the part comes into the opening of the light quantity control member, when the lens barrel is in a storage state. This feature makes it possible to reduce the size of the lens barrel at the time of the collapse as compared with the conventional one, and thus, it is possible to provide a thin type of camera excellent in portability.

In case of an electronic camera, there is no problem on a point that when the lens barrel is in the storage state, it is set to a state that light may passes through the light quantity control member. However, in case of the conventional type of camera that photography is carried out on a silver halide film, setting to the state that light may passes through the light quantity control member involves a possibility that the silver halide film is exposed with the light passing through the light quantity control member. But, this problem is concerned with when no measures is taken, and this problem can be solved in accordance with provision of, for example, a lens cover, a front cover or a lens barrier, which are excellent in a light shielding property, or provision of a focal plane shutter.

That is, the present invention is applicable to not only the electronic camera, but also the conventional type of camera that photography is carried out on a silver halide film.

In the camera according to the present invention as mentioned above, it is acceptable that when the lens barrel is in the storage state, the light quantity control member maintains an opening in an opening state that the opening is opened more than a maximum aperture in the image taking state.

There is a need to determine the maximum aperture in the image taking state from the viewpoint of the image taking efficiency. The size of the maximum aperture in the image taking state is not always an aperture size sufficient for accommodating at least part of members constituting any lens group of the plurality of lens groups in the opening of the light quantity control member, at the time of the storage state. In this case, when the lens barrel is in the storage state, the light quantity control member maintains the opening in an opening state that the opening is opened more than a maximum aperture in the image taking state. Thus, it is possible to satisfy both the image taking ability and the storage ability.

In the camera according to the present invention as mentioned above, it is preferable that the light quantity control member is free in changing over of states between a use state that a light quantity of a photographic light passing through the image taking lens is controlled and a non-use state wherein it is permitted that at least part of members constituting any lens group of the plurality of lens groups constituting the image taking lens comes into an opening of the light quantity control member, and when the lens barrel is in the image taking state, the light quantity control member is in the use state to control a light quantity of a photographic light passing through the image taking lens, and the camera further has a compulsory changing over member that forcibly changes over the light quantity control member to the non-use state, before the part is in contact with the light quantity control member, when the lens barrel moves from the image taking state to the storage state.

Even if a malfunction of the lens control system or a mechanical shock in operation bring about an approach of the lens groups to the light quantity control member, the presence of the compulsory changing over member makes it possible to avoid a mechanical destroy of the lens barrel since the light quantity control member moves to the non-use state.

In the camera according to the present invention as mentioned above, it is preferable that the compulsory changing over member is a rod-like shaped member projecting toward the light quantity control member provided on a side of the lens groups, and the light quantity control member is in contact with the compulsory changing over member, before the part is in contact with the light quantity control member, when the lens barrel moves from the image taking state to the storage state, so that the light quantity control member changes over to the non-use state upon receipt of a driving force wherein the lens barrel moves to the storage state, via the compulsory changing over member.

The use of the rod-like shaped member makes it possible to avoid a possibility that the lens groups are in contact with the light quantity control member, and also possible to readily change over the light quantity control member to the non-use state in accordance with the movement of the lens barrel to the storage state.

In the camera according to the present invention as mentioned above, it is preferable that the lens barrel further comprises control means that maintains the non-use state wherein the light quantity control member withdraws to a withdrawal position wherein it is permitted that at least part of members constituting any lens group of the plurality of lens groups constituting the image taking lens comes into an opening of the light quantity control member, when the lens barrel is in the storage state, and controls an approach of the lens groups to the light quantity control member in an optical axis direction, when the light quantity control member is in a non-withdrawal position.

In the camera according to the present invention as mentioned above, it is acceptable that the control means comprises an engagement member provided on a side of the lens groups, and a control member that comes into a movement path for the engagement member from out of the movement path in connection with a movement of the light quantity control member from the withdrawal position to the non-withdrawal position, and the control member is constructed in such a manner that before at least part of the lens groups is in contact with the light quantity control member at the non-withdrawal position, the control member is in contact with the engagement member to prevent contact of the part with the light quantity control member.

In the camera according to the present invention as mentioned above, it is acceptable that the light quantity control member consists of an aperture blade, and the control member is constructed in united body with the aperture blade.

It is acceptable that there is provided such an arrangement that the control member withdraws from inside a movement path for the engagement member to outside the movement path at the time of the shutter open in connection with a movement of the shutter blade.

BRIEF DESCRIPTION OF THE DRAWINGS

FIG. 15(A) is a schematic illustration showing a structure of a shutter unit where aperture blades are located at the open position and FIG. 15(B) is a schematic illustration showing a structure of a shutter unit where aperture blades are located at the stop position.

DETAILED DESCRIPTION OF PREFERRED EMBODIMENTS

Embodiments of the present invention will be described with reference to the accompanying drawings.

Figure 1:
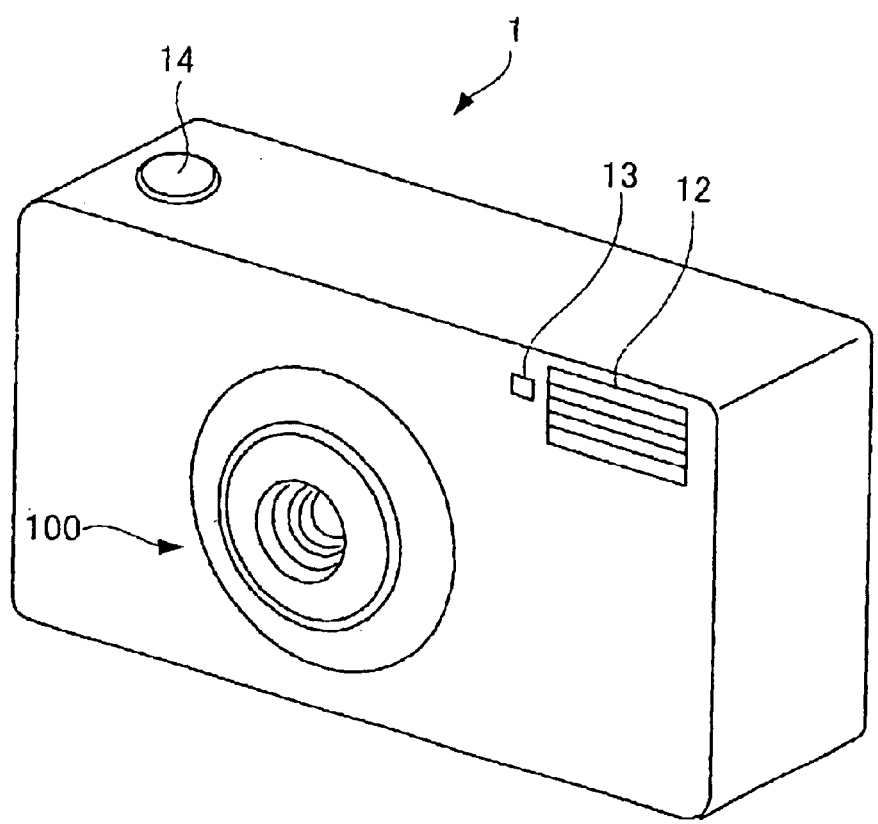
FIG. 1 is a perspective view of a first embodiment of a camera of the present invention.
Figure 2:
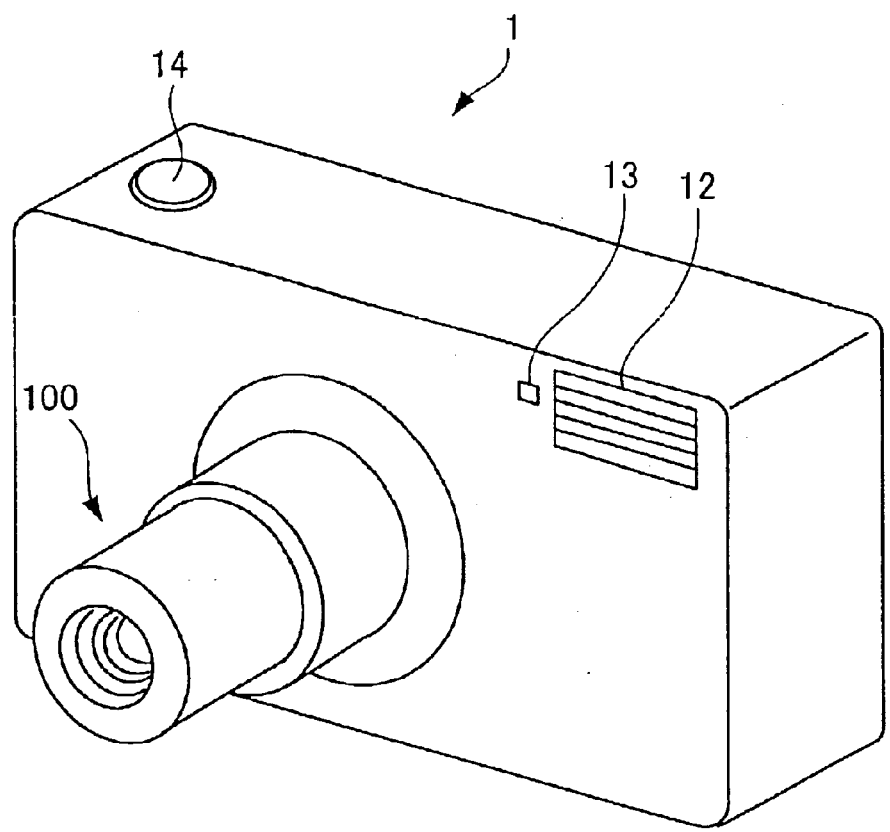
FIG. 2 is a perspective view of a first embodiment of a camera of the present invention.

Each of FIG. 1 and FIG. 2 is a perspective view of a first embodiment of a camera of the present invention.

FIG. 1 shows a collapsed state of a lens barrel 100 incorporating therein a zoom lens of a camera 1 of the present embodiment. FIG. 2 shows an extended state of the lens barrel 100 of the camera 1.

Figure 17:
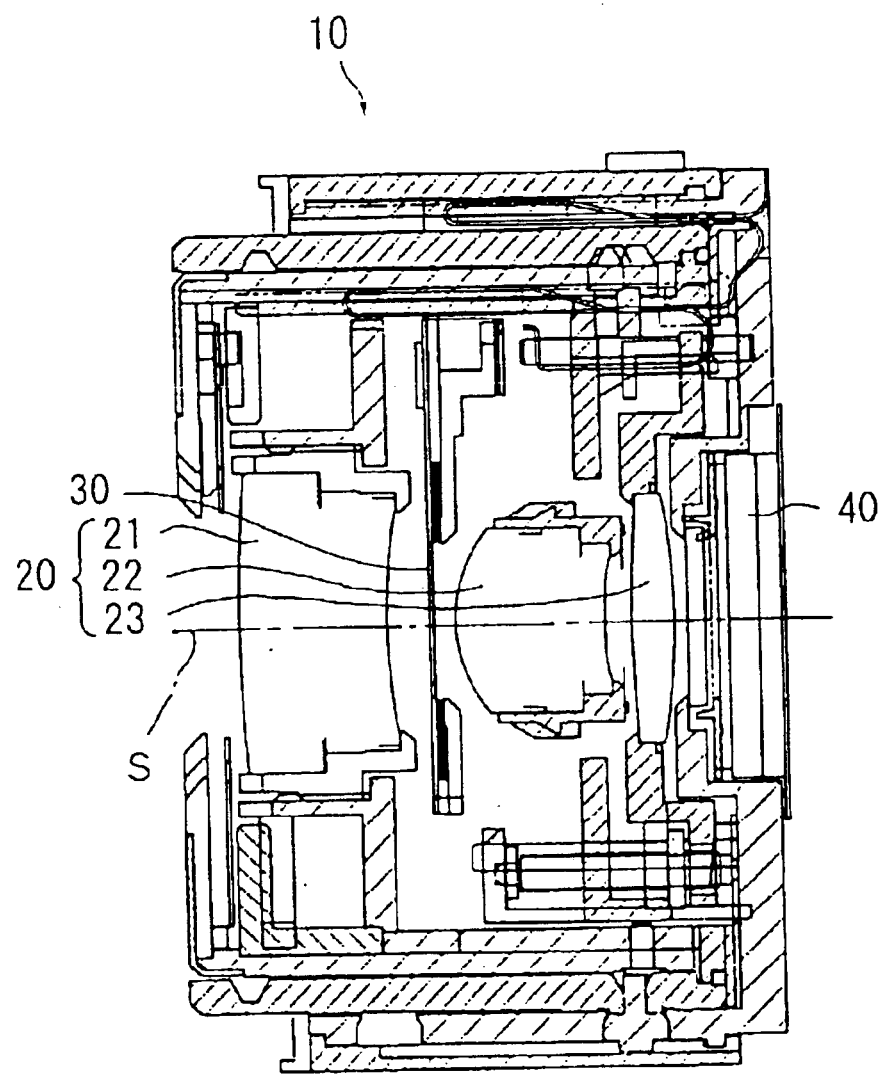
FIG. 17 is a sectional view of a lens barrel of the conventional camera at the time of collapse taken along an optical axis.

The lens barrel 100 of the camera 1 shown in FIG. 1 and FIG. 2 incorporates therein a zoom lens consisting of three lens groups as explained referring to FIG. 17. A movement of those three lens groups in an optical axis direction makes it possible to perform an adjustment of a focal length. And movements of the third group lens in the optical axis direction make it possible to perform an adjustment of a focusing.

In upper front of the camera 1 shown in FIG. 1 and FIG. 2, there are disposed a flash window 12 and a finder objective window 13. On the top of the camera 1, there is disposed a shutter button 14.

On the back (not illustrated) of the camera 1, there is disposed a zoom operation switch. When one end of the zoom operation switch is depressed, the lens barrel 100 is extended to a telephoto side while the zoom operation switch is depressed. And when another end of the zoom operation switch is depressed, the lens barrel 100 is moved to a wide-angle side while the zoom operation switch is depressed.

Figure 3:
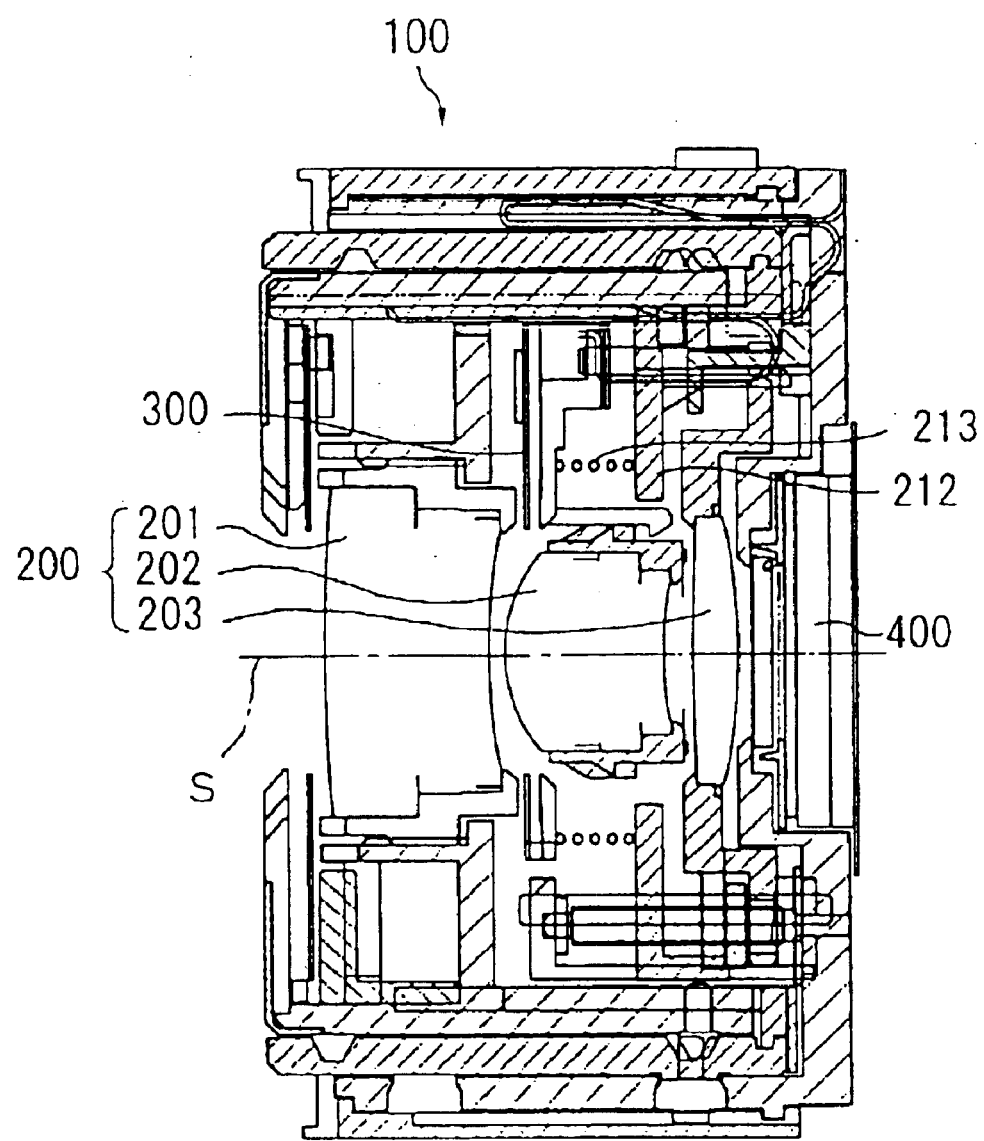
FIG. 3 is a sectional view of a lens barrel, which is included in the camera shown in FIG. 1 and FIG. 2, taken along an optical axis in a state of a collapse.
Figure 4:
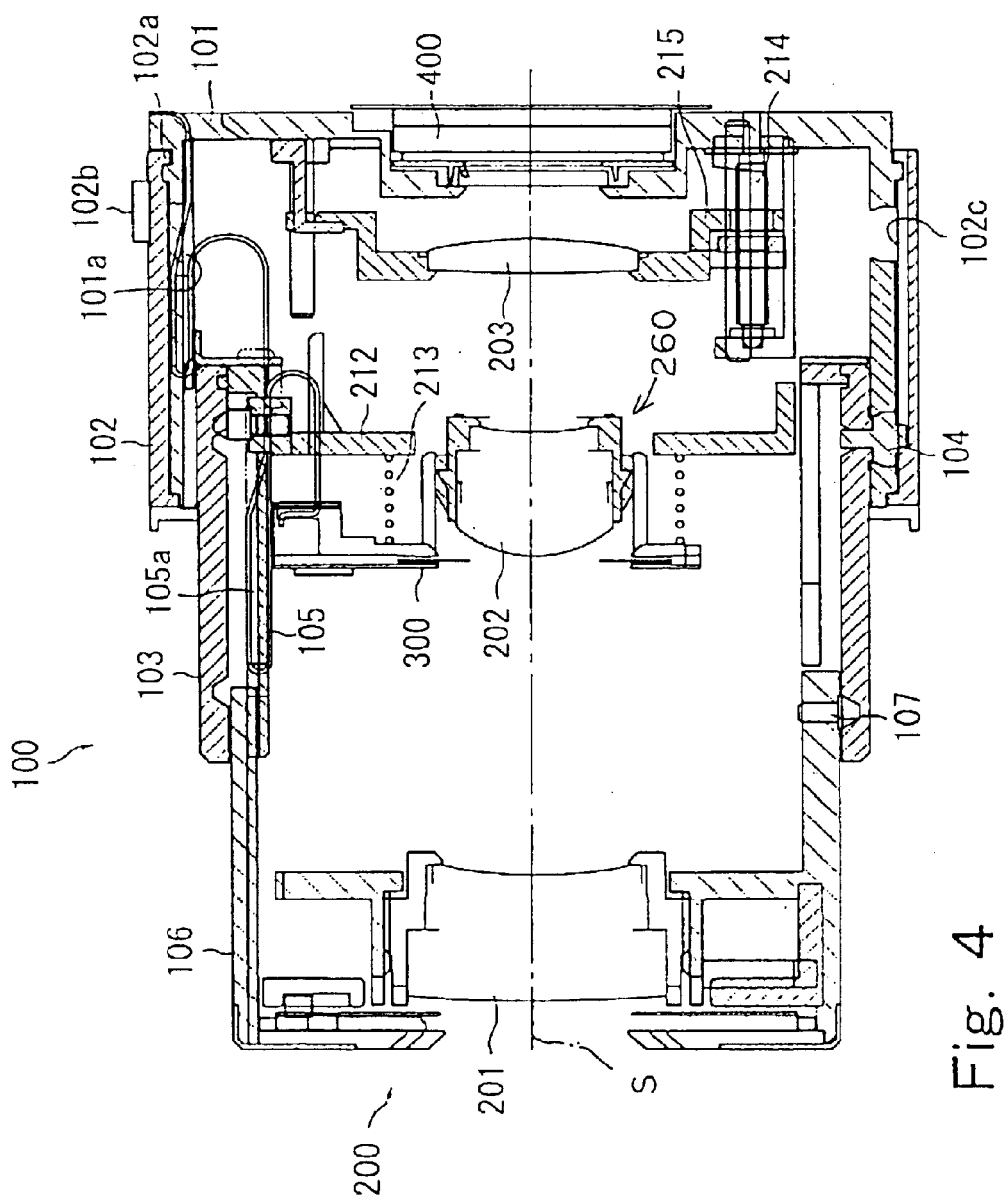
FIG. 4 is a sectional view of the same lens barrel as FIG. 3, taken along an optical axis in a state of the maximum extension.

FIG. 3 is a sectional view of a lens barrel, which is included in the camera shown in FIG. 1 and FIG. 2, taken along an optical axis in a state of a collapse. FIG. 4 is a sectional view of the same lens barrel as FIG. 3, taken along an optical axis in a state of the maximum extension.

The lens barrel 100 is provided with an image taking lens 200 consisting of a first group lens 201, a second group lens 202 and a third group lens 203. And the lens barrel 100 is free in collapse and extension between the collapsed state shown in FIG. 3 and the maximum extended state shown in FIG. 4.

The lens barrel 100 moves in an optical axis direction in such a manner that when the lens barrel 100 moves between the minimum extended state extended from the collapsed state shown in FIG. 3 to a certain extent and the maximum extended state shown in FIG. 4, the first group lens 201, the second group lens 202 and the third group lens 203, which constitute the image taking lens 200 provided on the lens barrel 100, vary in focal length. That is, the image taking lens 200 serves as a zoom lens. And a focusing is carried out when only the third group lens 203 of the image taking lens 200 moves in the optical axis direction.

Details of a mechanism for collapse and extension will be described later.

The lens barrel 100 is provided with a lens shutter 300 between the first group lens 201 and the second group lens 202 which constitute the image taking lens 200. The lens shutter 300 is an example of the light quantity control member referred to in the present invention. The lens shutter 300 is mounted, as shown in FIG. 4, on a second group lens holding frame 212 for holding the second group lens 202 in a state that it is enabled forward by a coil spring 213. The lens shutter 300 is so arranged that at the time of the collapse, the coil spring 213 is compressed by a push of a holding frame of the first group lens 201, so that the lens shutter 300 moves to the second group lens side.

According to the lens shutter 300, the maximum aperture at the time of the photography is restricted to a predetermined aperture size, so that a photographic efficiency is maintained. As to the lens shutter, as shown in FIG. 3, at the time of the collapse, the lens shutter is opened to an aperture size of an open state in which the aperture size of the lens shutter is expanded more than the aperture size (cf. FIG. 4) of the maximum aperture at the time of the photography. The aperture size of the lens shutter in the open state is, as shown in FIG. 3, larger than the outside diameter of the second group lens 202 of the image taking lens 200. And at the time of the collapse, the second group lens 202 comes into the aperture of the lens shutter 300. Thus, according to the present embodiment, the size of the lens barrel in the collapsed state in the optical axis direction is shorter than the size of the lens barrel in the collapsed state, according to the conventional one as shown in FIG. 17.

Further, on the rear of the image taking lens 200, there is provided a CCD imaging device 400 fixed on a fixing frame 101 fixed on the camera body.

Here, there will be explained an operation of the lens barrel 100 between the collapsed state shown in FIG. 3 and the maximum extended state shown in FIG. 4.

The lens barrel 100 is provided with a fixing frame 101 fixed on the camera body and a driving barrel 102 rotatable with respect to the fixing frame 101. While the driving barrel 102 is rotatable with respect to the fixing frame 101, a projection 102a provided in a circumference direction is engaged with a groove extending in the circumference direction of the fixing frame 101, so that the driving barrel 102 is prohibited from a movement in an optical axis direction with respect to the fixing frame 101. The driving barrel 102 is provided with a gear 102b on the periphery. The gear 102b is engaged with a driving gear (not illustrated) to transmit a driving power from a motor (not illustrated) via the gear 102b, so that the driving barrel 102 rotates.

The driving barrel 102 is further provided with a key groove 102c extending in the optical axis direction. A pin-like shaped cam follower 104, which is fixed on a rotary moving barrel 103, comes into the key groove 102c through penetrating the cam groove provided on the fixing frame 101. Accordingly, when the driving barrel 102 is rotated, the rotary moving barrel 103 is also rotated together with the driving barrel 102, since the cam follower 104 comes into the key groove 102c. And since the cam follower 104 penetrates the cam groove provided on the fixing frame 101, the cam follower 104 rotates with the rotation of the driving barrel 102 and moves in the optical axis direction in accordance with the geometry of the cam groove.

Inside the rotary moving barrel 103, there is provided a translational moving frame 105, which is engaged with the rotary moving barrel 103 in such a manner that the translational moving frame 105 is relatively rotatable with respect to the rotary moving barrel 103, and is prohibited from the rotation by engagement with a key groove 101a of the fixing frame 101. Accordingly, when the rotary moving barrel 103 rotates with the rotation of the driving barrel 102 and moves in the optical axis direction, the translational moving frame 105 moves in the optical axis direction with the movement of the rotary moving barrel 103. However, the translational moving frame 105 is prohibited from the rotation by engagement with a key groove 101a of the fixing frame 101, and translationally moves in the optical axis direction with the movement of the rotary moving barrel 103.

The second group lens 202 is held in a second group lens holding frame 212. A cam follower 216 fixed on the second group lens holding frame 212 comes into the cam groove of the rotary moving barrel 103 and also a key groove 105a extending in the optical axis direction of the translational moving frame 105. Accordingly, when the rotary moving barrel 103 rotates with the rotation of the driving barrel 102 and moves in the optical axis direction, a second group of lens unit 260, which consists of the second group lens holding frame 212 and the second group lens 202 held in the second group lens holding frame 212, translates in the optical axis direction along a geometry of the cam groove of the rotary moving barrel 103 into which the cam follower 216 comes.

As mentioned above, the lens shutter 300 is mounted on the lens unit 260 in a state that it is enabled forward by the coil spring 213. Thus, the lens shutter 300 also moves in the optical axis direction together with the lens unit 260.

Further, the lens barrel 100 is provided with a translational moving barrel 106 for holding the first group lens 201. A cam follower 107 fixed on the translational moving barrel 106 comes into the cam groove of the rotary moving barrel 103 and also the key groove 105a extending in the optical axis direction of the translational moving frame 105. Accordingly, when the rotary moving barrel 103 rotates with the rotation of the driving barrel 102 and moves in the optical axis direction, the translational moving barrel 106 translates in the optical axis direction along a geometry of the cam groove of the rotary moving barrel 103 into which the cam follower 107 comes.

In this manner, the extension is carried out, and when the driving barrel 102 reversely rotates, the collapse is carried out.

The third group lens 203 of the image taking lens 200 moves in the optical axis direction with the rotation of a lead screw 214 by a driving source (not illustrated), so that focusing is performed, when the lead screw 214 rotates, since a nut 217, which is held in united body in a third group lens holding frame 215 holding the third group lens 203, is engaged with the lead screw 214.

Figure 5:
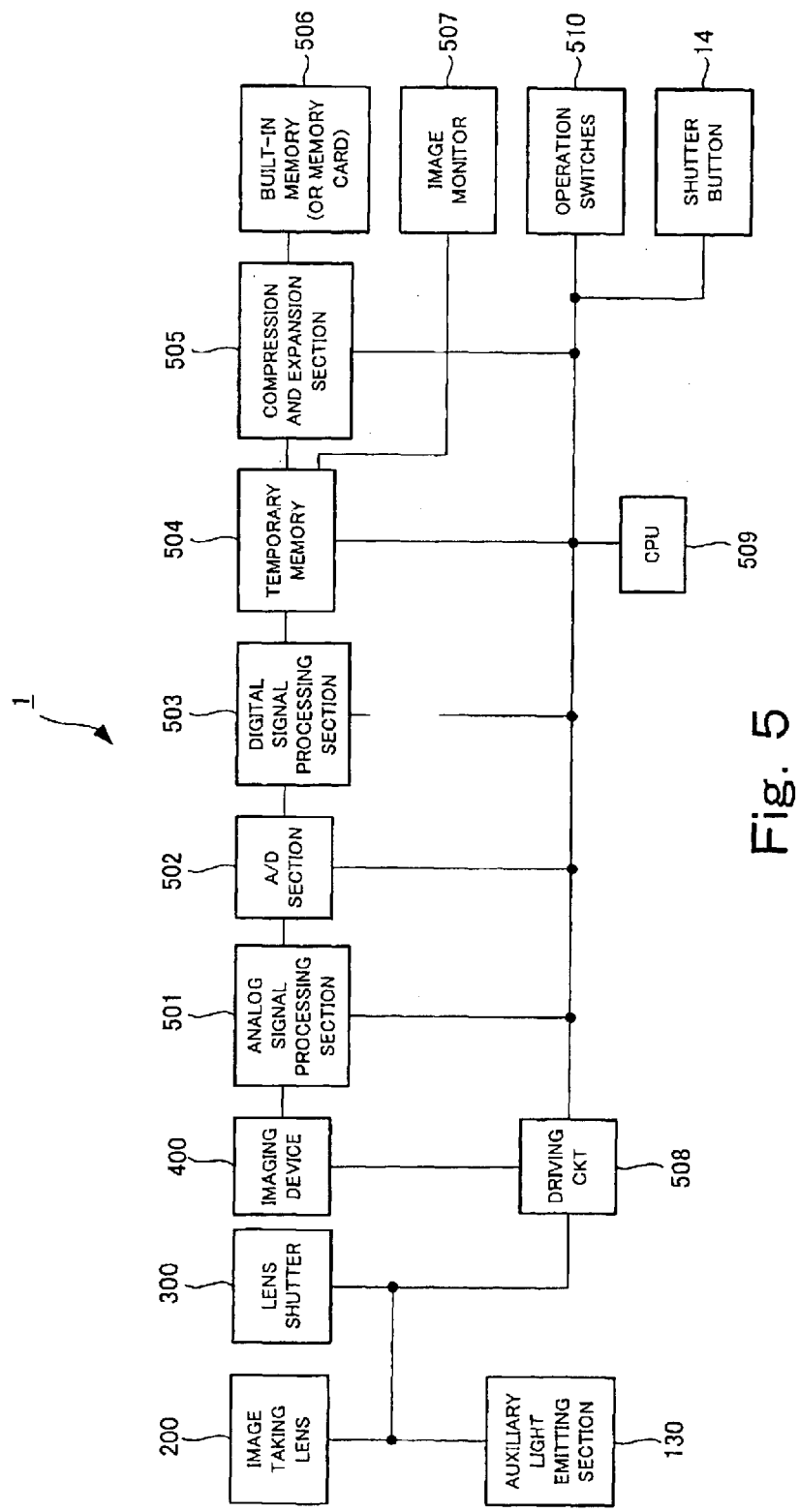
FIG. 5 is a block diagram of a circuit of the camera shown in FIG. 1.

FIG. 5 is a block diagram of a circuit of the camera shown in FIG. 1.

The camera 1 is provided with the image taking lens 200, the lens shutter 300, and the CCD imaging device 400, as mentioned above. A subject image formed on the CCD imaging device 400 via the image taking lens 200 and the lens shutter 300 is converted into an analog image signal by the CCD imaging device 400. The lens shutter 300 serves to suppress generation of smear due to light when analog signals are read from the CCD imaging device 400.

The camera 1 is further provided with an auxiliary light emitting section 130. The auxiliary light emitting section 130 emits an auxiliary light at the time of a low illumination. The auxiliary light emitting section 130 may emit the auxiliary light at any necessary time other than the low illumination.

The camera 1 is further provided with an analog signal processing section 501, an A/D section 502, a digital signal processing section 503, a temporary memory 504, a compression and expansion section 505, a built-in memory (or a memory card) 506, an image monitor 507, and a driving circuit 508. The CCD imaging device 400 is driven by a timing generated from a timing generating circuit (not illustrated) of the driving circuit 508, and outputs an analog image signal. The driving circuit 508 includes driving circuits for driving the image taking lens 200, the lens shutter 300 and the auxiliary light emitting section 130. The analog image signal outputted from the CCD imaging device 400 is subjected to an analog signal processing by the analog signal processing section 501, an A/D conversion by the A/D section 502, and a digital signal processing by the digital signal processing section 503. Data representative of the signal subjected to the digital signal processing is temporarily stored in the temporary memory 504. The data stored in the temporary memory 504 is compressed by the compression and expansion section 505 and is recorded into the built-in memory (or a memory card) 506. Incidentally, in some photographic mode, it is acceptable that the data is recorded directly into the built-in memory 506 omitting the process of the compression. The data stored in the temporary memory 504 is read to the image monitor 507 so that an image of the subject is displayed on the image monitor 507.

The camera 1 is further provided with a CPU 509 for controlling the camera in its entirety, operation switches 510, and a shutter button 14. Photography is performed when the shutter button 14 is depressed through setting to a desired photographic state by operation of the operation switches 510.

Next, there will be explained the second embodiment of the present invention.

The perspective view and the circuit structure of the camera of the second embodiment are the same as the perspective view (FIG. 1 and FIG. 2) and the circuit structure (FIG. 5) of the camera of the first embodiment, and thus here there will be explained only the lens barrel which is different therebetween.

Figure 6:
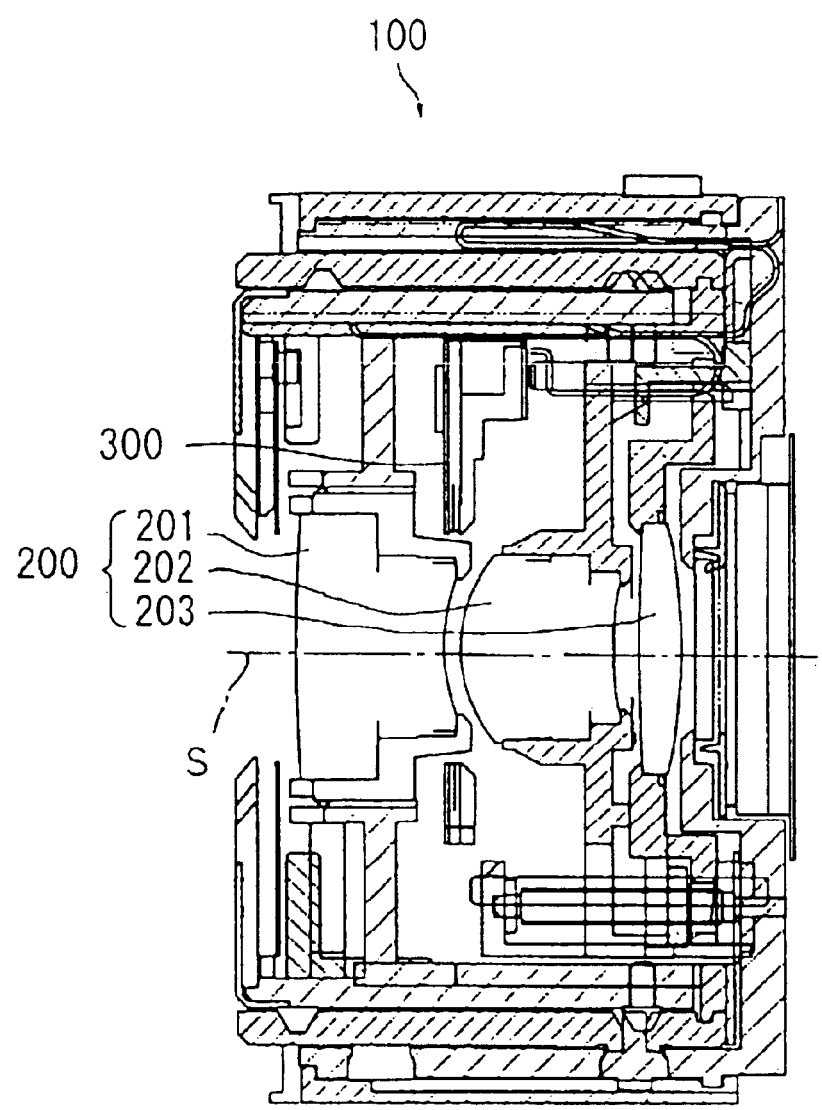
FIG. 6 is a sectional view of a lens barrel according to the second embodiment, taken along an optical axis in a state of a collapse.
Figure 7:
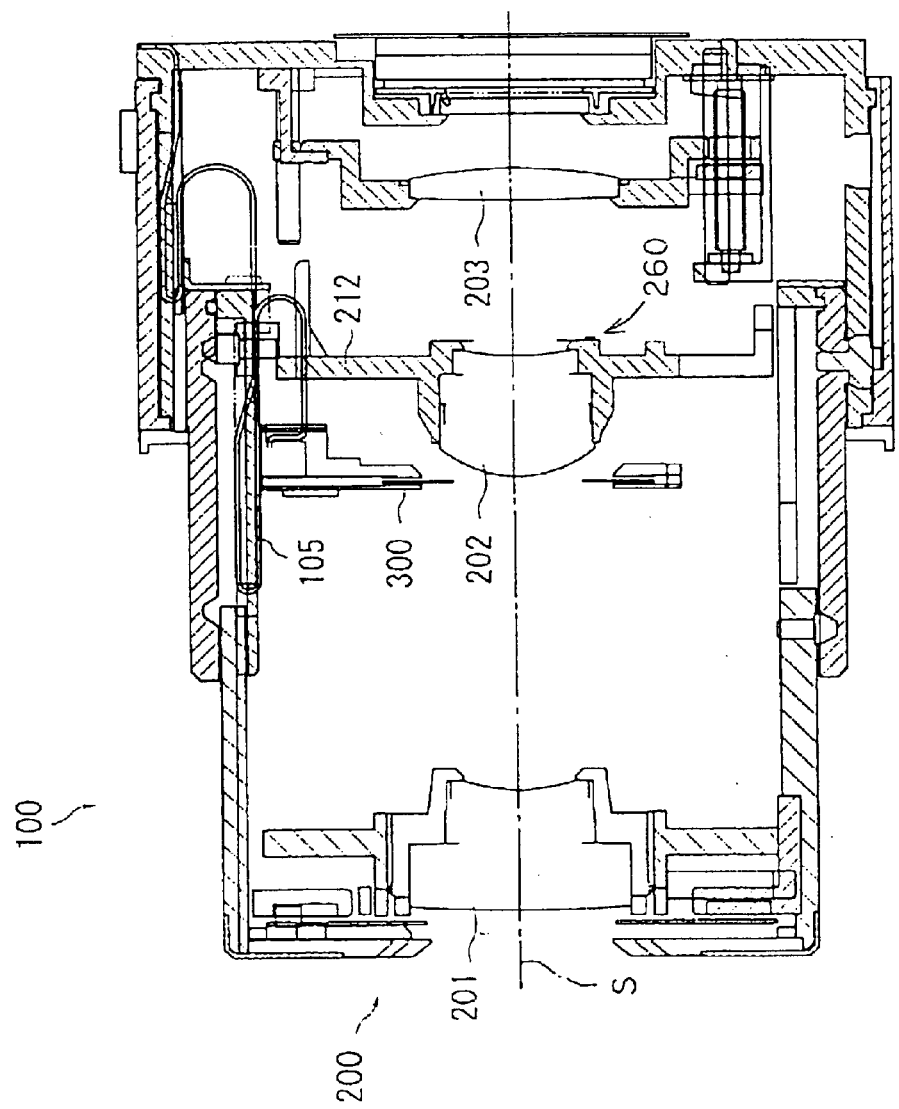
FIG. 7 is a sectional view of a lens barrel according to the second embodiment, taken along an optical axis in a state of the maximum extension.

FIG. 6 is a sectional view of a lens barrel according to the second embodiment, taken along an optical axis in a state of a collapse. FIG. 7 is a sectional view of a lens barrel according to the second embodiment, taken along an optical axis in a state of the maximum extension. In the following figures, the same parts are denoted by the same reference numbers as those of FIG. 3 and FIG. 4, and the redundant explanation will be omitted.

The lens shutter 300 provided on the lens barrel 100 according to the second embodiment is fixed, as shown in FIG. 7, on the second group lens holding frame 212 for holding the second group lens 202 of the image taking lens 200. Accordingly, the second group lens 202 and the lens shutter 300 always maintain a predetermined interval therebetween regardless of the states of the lens barrel 100, that is, the collapsed state or any extended state.

The maximum aperture of the lens shutter 300 at the time of an operation is an aperture size as shown in FIG. 7. At the time of the collapse, the aperture size is further expanded and is an aperture size of the open state as shown in FIG. 6. At the time of the collapse, the first group lens 201 of the image taking lens 200 comes into the aperture expanded to the aperture size in the open state of the lens shutter 300. Thus, the size of the lens barrel 100 in the optical axis direction at the time of the collapse is shorter than that of the conventional one shown in FIG. 17.

In this manner, it is acceptable that the lens group, which comes into the aperture of the lens shutter at the time of collapse, is any one of both the lens groups between which the lens shutter 300 is interposed.

While a three-group construction of image taking lens has been explained, it is acceptable that the present invention is applicable to, for example, a two-group construction of image taking lens, and four or more-group construction of image taking lens other than the three-group construction of image taking lens.

Further, there is explained an example in which as the image taking lens the zoom lens is adopted, it is not always necessary for the present invention that as the image taking lens the zoom lens is adopted, and the present invention is also applicable to a camera which is free in collapse and extension and maintains for example a fixed focal length at the time of extension.

Furthermore, according to the present embodiment, while there is raised by way of example the lens shutter wherein the aperture at the time of collapse is expanded more than the maximum aperture at the time of photography, it is acceptable to provide such a construction that the maximum aperture at the time of photography is the aperture at the time of collapse as it is and the lens group comes into the aperture.

With respect to the lens shutter, while no relation between the shutter blade and the aperture is referred to, it is acceptable that the lens shutter is a lens shutter in which the shutter blade serves as the aperture blade as well, or alternatively a lens shutter provided with an aperture independently of the shutter blade.

There is no need that the light quantity control member referred to in the present invention is the lens shutter, and it is acceptable that the light quantity control member is an aperture member having an aperture blade or an aperture member having a plurality of apertures switchingly selectable or a single aperture.

Next, there will be explained the third embodiment of the present invention.

The perspective view of the camera of the third embodiment is the same as the perspective view (FIG. 1 and FIG. 2) of the camera of the first embodiment, and the circuit construction is different, as compared with the circuit construction (FIG. 5) in the first embodiment, in the point that the lens shutter 300 is replaced by the aperture unit, and the driving circuit 508 drives the aperture blade of the aperture unit. And the external appearance and the circuit construction of the camera are not subject of the present invention and thus there will be explained only the lens barrel. Also with respect to the embodiments following the fourth embodiment which will be explained later, the external appearance and the circuit construction of the camera will be omitted in illustration and explanation.

Figure 8:
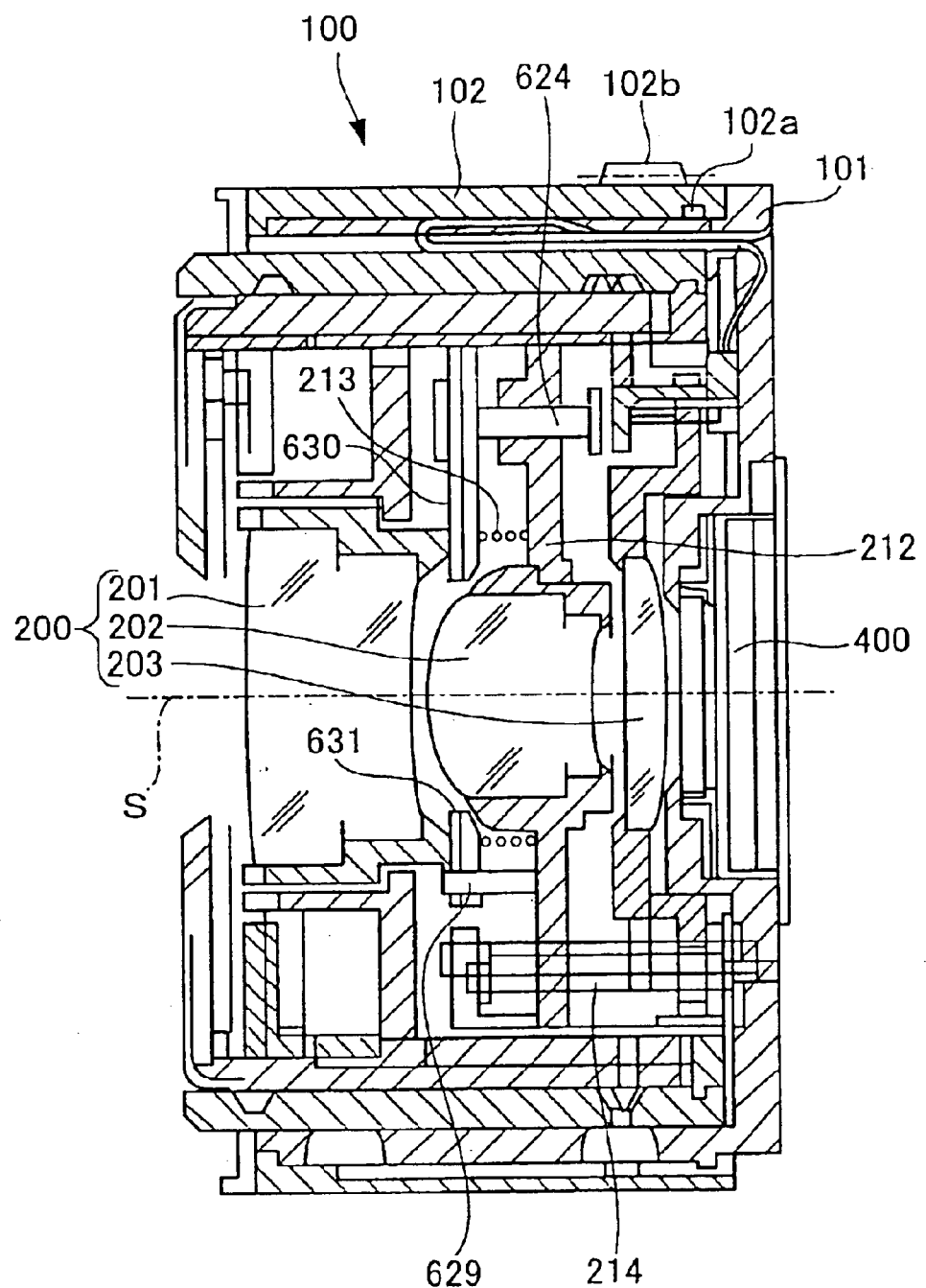
FIG. 8 is a sectional view of a lens barrel of a camera according to the third embodiment, taken along an optical axis in a state of a collapse.
Figure 9:
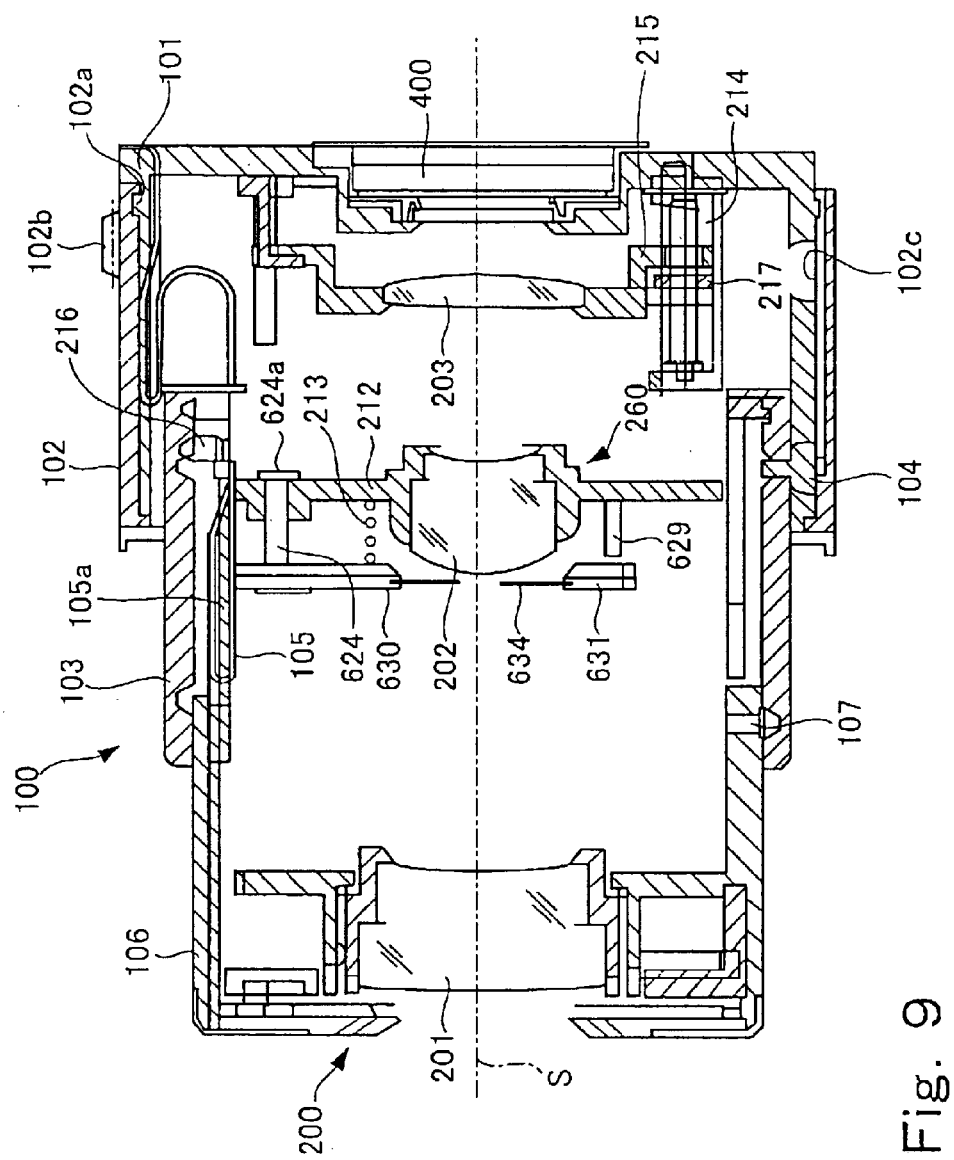
FIG. 9 is a sectional view of a lens barrel of a camera according to the third embodiment, taken along an optical axis in a state of the maximum extension.

FIG. 8 is a sectional view of a lens barrel of a camera according to the third embodiment, taken along an optical axis S in a state of a collapse. FIG. 9 is a sectional view of a lens barrel of a camera according to the third embodiment, taken along an optical axis S in a state of the maximum extension.

The lens barrel 100 is provided with the image taking lens 200 consisting of the first group lens 201, the second group lens 202 and the third group lens 203, which are arranged, taken along the optical axis S. When those lens groups are moved in the optical axis direction, a focusing is performed. When the third group lens 203 is moved in the optical axis direction, a focusing is performed. Between the first group lens 201 and the second group lens 202, there is disposed an aperture unit 630. And after the image taking lens 200, there is disposed the CCD imaging device 400.

The aperture unit 630 is provided with a guide rod 624 projecting from its back in the optical axis direction. The guide rod 624 slidably goes through the second group lens holding frame 212 holding the second group lens 202 after the aperture unit 630 in the optical axis direction. At the rear edge of the guide rod 624, there is provided a stopper 624a, and between the aperture unit 630 and the second group lens holding frame 212 there is provided a coil spring 213 on a compression basis. This arrangement makes it possible that the aperture unit 630 is held in such a manner that the aperture unit 630 is movable backward the optical axis direction in a state that it is enabled forward by a spring force with respect to the second group lens unit 260 including the second group lens 202 and the second group lens holding frame 212. At the time of the collapse, the aperture unit 630 moves to the second group lens unit 260 side while compressing the coil spring 213.

The mechanism for collapse and extension of the lens barrel 100 is same as the camera (FIG. 3 and FIG. 4) of the first embodiment as mentioned above, and thus the redundant explanation will be omitted.

Figure 10:
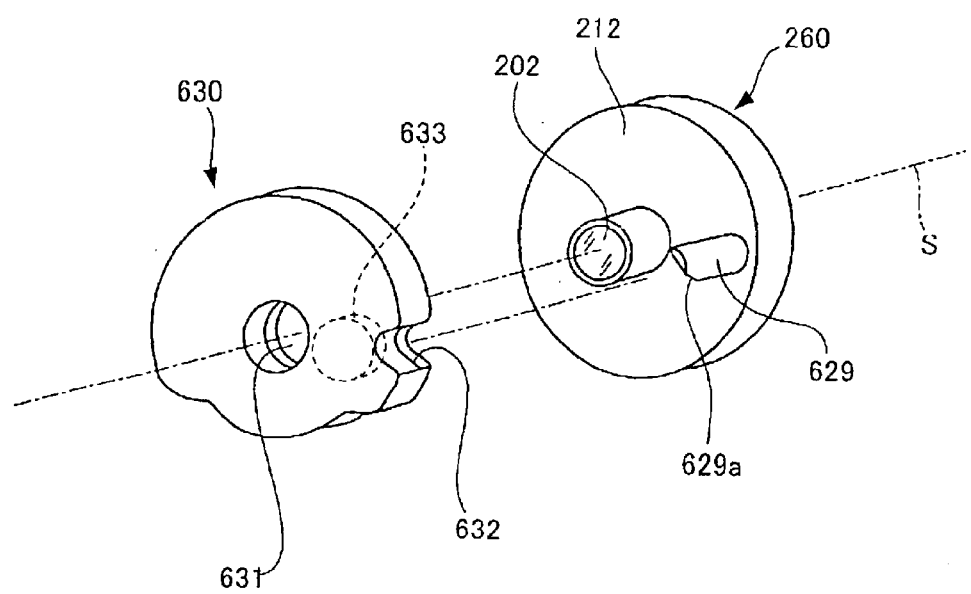
FIG. 10 is an exploded perspective view schematically showing the second group lens unit and an aperture unit disposed in front of the second group lens unit.

FIG. 10 is an exploded perspective view schematically showing the second group lens unit 260 and the aperture unit 630 disposed in front of the second group lens unit 260.

The second group lens unit 260 is provided with an engagement rod 629 (a compulsion withdraw member shaped as a rod) extending in the optical axis direction from one corner of the aperture unit 630 side of the second group lens holding frame 212 for holding the second group lens 202 to the aperture unit 630 side.

On the other hand, the aperture unit 630 is a circular opening 631 on the optical axis S. The opening 631 is opened, at the time of the collapse, to such an extent that the opening 631 accommodates the second group lens 202, as shown in FIG. 10.

The aperture unit 630 is further provided with a notch 632, which permits the engagement rod 629 of the second group lens unit 260 to enter at the time of collapse operation, on the extension line of the engagement rod 629.

The aperture unit 630 is still further provided with an actuator 633 for rotating an aperture blade 634 (cf. FIG. 11) on the rotating axis.

Figure 11A:
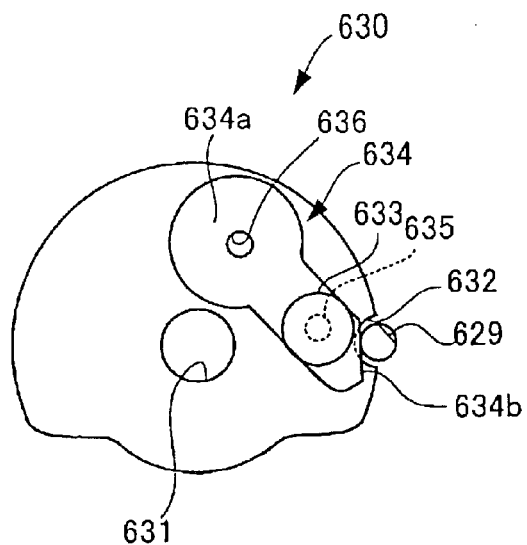
FIG. 11(A) is a schematic illustration showing a structure of an aperture unit where aperture blades are located at the open position and FIG. 15(B) is a schematic illustration showing a structure of an aperture unit where aperture blades are located at the stop position.
Figure 11B:
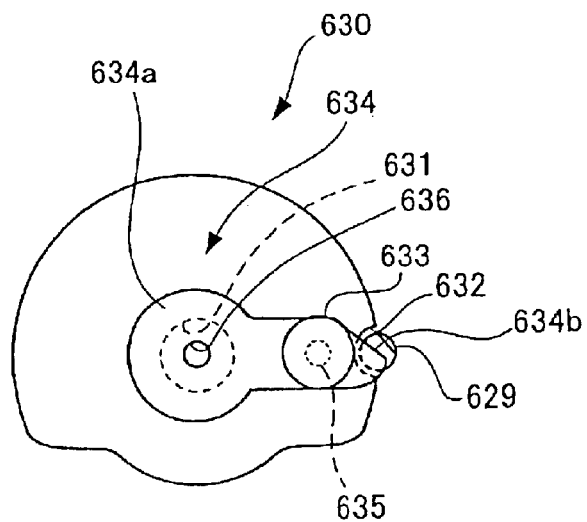

FIG. 11(A) is a schematic illustration showing a structure of the aperture unit 630 where the aperture blade 634 is located at the open position and FIG. 11(B) is a schematic illustration showing a structure of the aperture unit 630 where the aperture blade 634 is located at the stop position. The aperture blade 634 is rotatable on a driving axis 635 of the actuator 633 between the open position shown in FIG. 11(A), or a withdrawal position and the stop position shown in FIG. 11(B), or a non-withdrawal position.

The driving axis 635 of the actuator 633 is enabled by a spring force so that the aperture blade 634 is moved to the non-withdrawal position of FIG. 11(B). When the conduction is broken, the aperture blade 634 is again moved to the non-withdrawal position of FIG. 11(B).

The aperture blade 634 withdraws by the side of the opening 631 of the aperture unit 630 at the time of opening, and thus does not interfere with the opening 631. However, at the aperture position (non-withdrawal position), the aperture blade 634 is provided with such a size of plate member 634a that the opening 631 is covered, at one end of the driving axis 635, wherein at the center of the plate member 634a there is formed a small hole 636 through which light passes.

When the lens barrel 100 is in a state of the extension (cf. FIG. 4), the aperture unit 630 is in a using state that a light quantity of photographic light, which passes through the image taking lens 200, is controlled. In this using state, when the subject is relatively dark, the aperture blade 634 moves to the opening position, as shown in FIG. 11(A), in which the aperture blade 634 withdraws by the side of the opening 631, and when the subject is relatively light, the aperture blade 634 moves to the aperture position (the non-withdrawal position), in which the aperture blade 634 overlaps with the opening 631. On the other hand, when the lens barrel 100 is in a state of the collapse (cf. FIG. 8), the aperture unit 630 is in the withdrawal state that the aperture blade 634 is kept on the opening position (the withdrawal position).

On the side opposite to the plate member 634a with respect to the axis 635 of the aperture blade 634, there is provided a cam member 634b which does not interfere with the notch 632 of the aperture unit 630 at the time of the opening, but interferes with the engagement rod 629 that moves, at the time of the stopping, to a position wherein the engagement rod 629 overlaps with the notch 632, and comes into the notch 632 at the time of the collapse operation.

The engagement rod 629 of the lens unit 260 has, as shown in FIG. 10, a taper section 629a on the top. The engagement rod 629 comes into the notch 632 at the time of the collapse operation, so that the taper section 629a pushes the cam member 634b of the aperture blade 634 located at the stop position. Then, the cam member 634b rotates to the opening position (the withdrawal position) of FIG. 11(A) against the spring enabling force to the stop position shown in FIG. 11(B), of the driving axis 635 of the actuator 633. The second group lens 202 comes into the opening 631 thus opened.

In this manner, according to the aperture unit 630, before the second group lens 202 comes into the opening 631, the aperture blade 634 moves to the withdrawal position by the engagement rod 629. Accordingly, it is prevented that the aperture blade is broken by the contact with the second group lens 202.

As apparent from the above explanation, according to the third embodiment, at the time of the collapse as shown in FIG. 8, the lens unit 260 and the aperture unit 630 are held in the state that the second group lens 202 comes into the opening 631 of the aperture unit 630. Thus, it is possible to reduce the size of the lens barrel at the time of the collapse as compared with the conventional one, and thus, it is possible to provide a thin type of camera excellent in portability.

Further, as shown in FIG. 11(B), when the aperture blade 634 exists within the opening 631 of the aperture unit 630, that is, when the aperture blade 634 is in the non-withdrawal position, even if it is intended that the second group lens 202 comes into the opening 631 of the aperture unit 630 in accordance with a malfunction of the lens control system or a mechanical shock in operation, the engagement rod 629 in the side of the lens unit 260 is in contact with the cam member 634b of the aperture blade 634 so that the aperture blade 634 moves to the withdrawal position shown in FIG. 11(A), before the second group lens 202 is in contact with the aperture blade 634. Thus, there is no possibility that the second group lens 202 is in contact with the aperture blade 634, and thus it is possible to reduce the collapse length while making sure of the reliability of the structural strength.

According to the third embodiment, the present invention is applied to the aperture of the digital camera. It is acceptable, however, that the present invention is applied to a shutter instead of the aperture, or alternatively, it is acceptable that the present invention is applied to both the shutter and the aperture.

Next, there will be explained the fourth embodiment.

Figure 12:
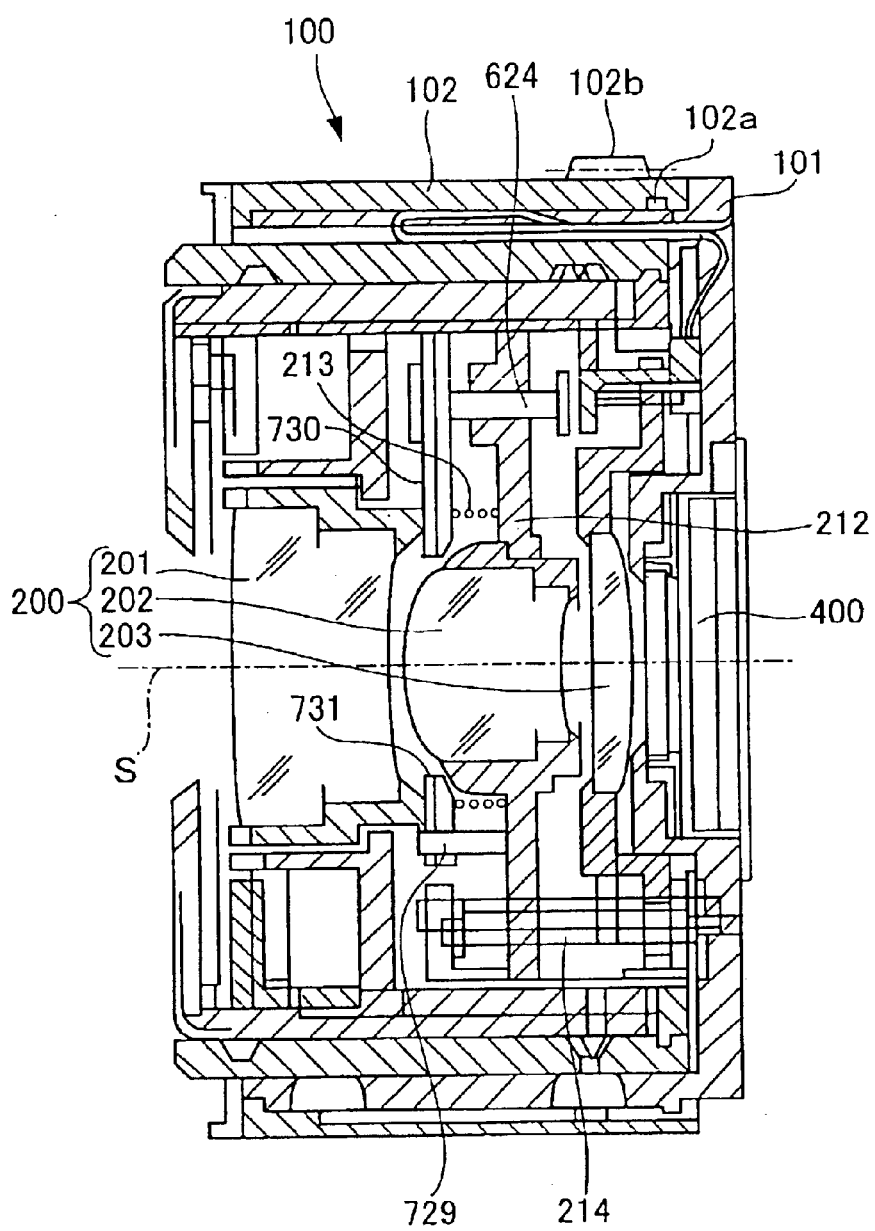
FIG. 12 is a sectional view of a lens barrel of a camera according to the fourth embodiment, taken along an optical axis in a state of a collapse.
Figure 13:
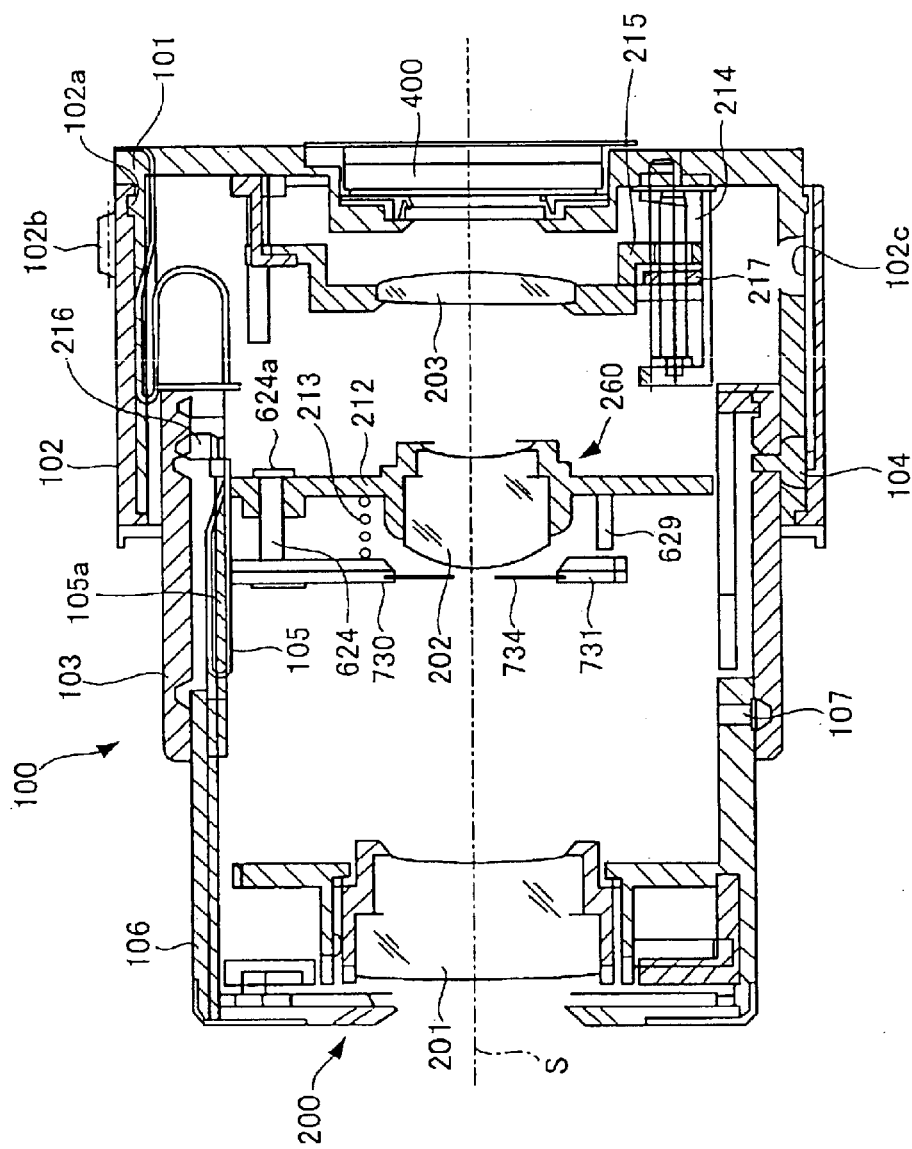
FIG. 13 is a sectional view of a lens barrel of a camera according to the forth embodiment, taken along an optical axis in a state of the maximum extension.

FIG. 12 is a sectional view of a lens barrel of a camera according to the fourth embodiment, taken along an optical axis S in a state of a collapse. FIG. 13 is a sectional view of a lens barrel of a camera according to the forth embodiment, taken along an optical axis S in a state of the maximum extension.

The lens barrel 100 is provided with the image taking lens 200 consisting of the first group lens 201, the second group lens 202 and the third group lens 203, which are arranged, taken along the optical axis S. When those lens groups are moved in the optical axis direction, a focusing is performed. When the third group lens 203 is moved in the optical axis direction, a focusing is performed. Between the first group lens 201 and the second group lens 202, there is disposed a shutter unit 730. And after the image taking lens 200, there is disposed the CCD imaging device 400.

The shutter unit 730 is provided with a guide rod 624 projecting from its back in the optical axis direction. The guide rod 624 slidably goes through the second group lens holding frame 212 holding the second group lens 202 after the aperture unit 630 in the optical axis direction. At the rear edge of the guide rod 624, there is provided a stopper 624a, and between the shutter unit 730 and the second group lens holding frame 212 there is provided a coil spring 213 on a compression basis. This arrangement makes it possible that the shutter unit 730 is held in such a manner that the shutter unit 730 is movable backward the optical axis direction in a state that it is enabled forward by a spring force with respect to the second group lens unit 260 including the second group lens 202 and the second group lens holding frame 212. At the time of the collapse, the shutter unit 730 moves to the second group lens unit 260 side while compressing the coil spring 213.

The mechanism for collapse and extension of the lens barrel 100 is same as the camera (FIG. 3 and FIG. 4) of the first embodiment as mentioned above, and thus the redundant explanation will be omitted.

Figure 14:
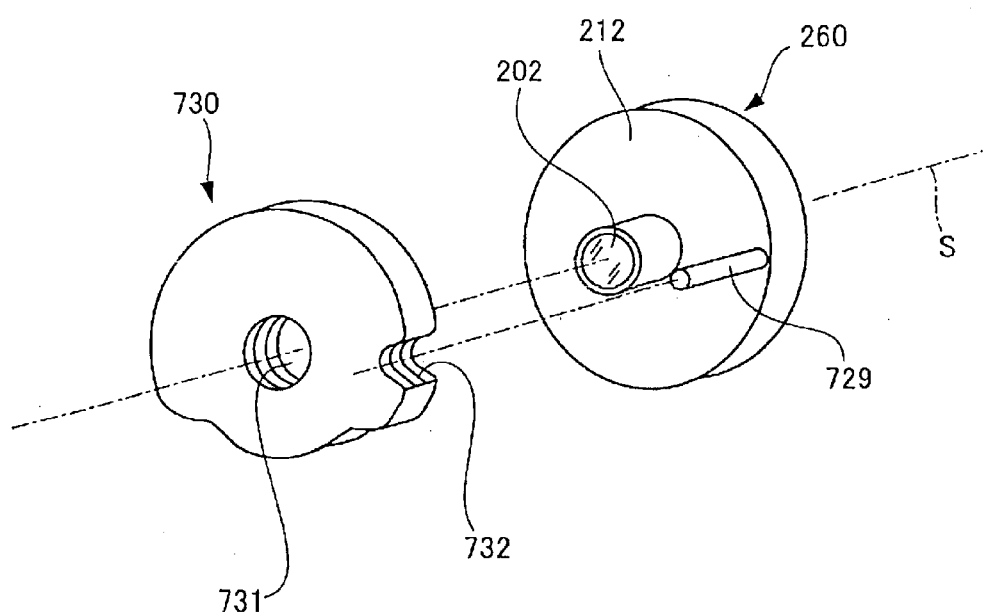
FIG. 14 is an exploded perspective view schematically showing the second group lens unit and a shutter unit disposed in front of the second group lens unit.

FIG. 14 is an exploded perspective view schematically showing the second group lens unit 260 and the shutter unit 730 disposed in front of the second group lens unit 260.

The second group lens unit 260 is provided with an engagement rod 629 (an engagement member) extending in the optical axis direction from one corner of the shutter unit 730 side of the second group lens holding frame 212 for holding the second group lens 202 to the shutter unit 730 side.

On the other hand, the shutter unit 730 is a circular opening 731 on the optical axis S. The opening 731 is opened, at the time of the collapse, to such an extent that the opening 731 accommodates the second group lens 202, as shown in FIG. 14. The opening 731 is closed by a shutter blade (not illustrated), at the time of the photography, excepting a predetermined short time for exposure.

The shutter unit 730 is further provided with a notch 732, which permits the engagement rod 729 of the second group lens unit 260 to enter at the time of collapse operation, on the extension line of the engagement rod 729.

Figure 15A:
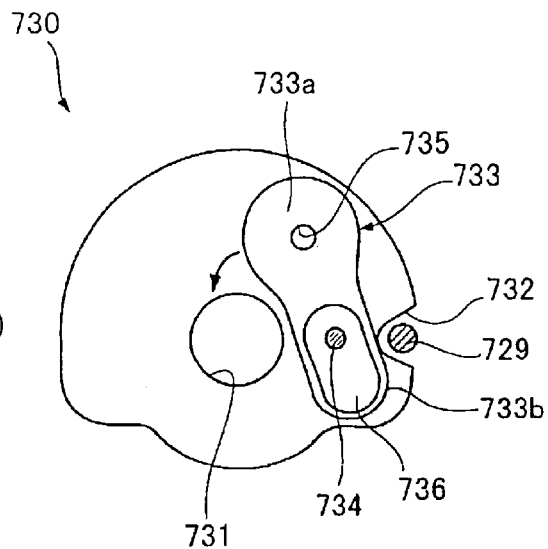

FIG. 15(A) is a schematic illustration showing a structure of the shutter unit 730 where aperture blades 733 are located at the open position and FIG. 11(B) is a schematic illustration showing a structure of a shutter unit where aperture blades 733 are located at the stop position. The aperture blade 733 is rotatable on an axis 734 between the open position shown in FIG. 15(A), or a withdrawal position and the stop position shown in FIG. 15(B), or a non-withdrawal position. Incidentally, omitted is in illustration a driving source for rotating the aperture blade 733 around the axis 734.

The aperture blade 733 withdraws by the side of the opening 731 of the shutter unit 730 at the time of opening, and thus does not interfere with the opening 731. However, at the time of the stop (non-withdrawal state), the aperture blade 733 is provided with such a size of plate member 733a that the opening 731 is covered, at one end of the axis 734, wherein at the center of the plate member 733a there is formed a small hole 735 through which light passes.

On the side opposite to the plate member 733a with respect to the axis 734 of the aperture blade 733, there is provided a plate member 733b (a control member) which does not interfere with the notch 732 of the shutter unit 730 at the time of the opening, but closes the notch 732, at the time of the stopping, to control an entry of the engagement rod 729 of the side of the second group lens unit 260 into the notch 732. Further, the plate member 733b is provided with a reinforcement plate 736 for increasing strength of the plate member 733b. However, in stead of the provision of the reinforcement plate 736, it is acceptable that the plate member 733b is formed with the more thickness per se.

The respective provision of the engagement rod 729 and the aperture blade 733 on the second group lens unit 260 and the shutter unit 730 permits the aperture blade 733 to move to the withdrawal position at the time of the collapse, as shown in FIG. 15(A), so that the opening 731 and the notch 732 of the shutter unit 730 are opened. This permits the entry of the second group lens 202 into the opening 731 and the entry of the engagement rod 729 into the notch 732, and thereby reducing the collapse length of the lens barrel.

Figure 15B:
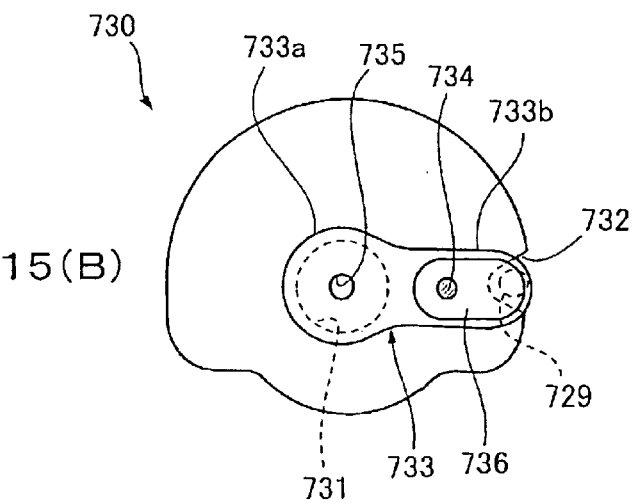

On the other hand, in the event that when the aperture blade 733 is at the non-withdrawal position as shown in FIG. 15(B), the shutter unit 730 moves in a direction making an approach to the lens unit 260 in accordance with a malfunction of the lens control system or a mechanical shock in operation, the plate member 733b of the aperture blade 733 is in contact with the top of the engagement rod 729 to prohibit further approach of the shutter unit 730 to the lens unit 260, before the aperture blade 733 at the non-withdrawal position is in contact with the second group lens 202. Thus, there is no possibility that the second group lens 202 is in contact with the aperture blade 733. Accordingly, it is prevented that the aperture blade 733 is broken by the contact with the second group lens 202.

As apparent from the above explanation, according to the fourth embodiment, at the time of the collapse as shown in FIG. 12, the lens unit 260 and the shutter unit 730 are held in the state that the second group lens 202 comes into the opening 731 of the shutter unit 730. Thus, it is possible to reduce the size of the lens barrel at the time of the collapse as compared with the conventional one, and thus, it is possible to provide a thin digital camera excellent in portability.

Further, as shown in FIG. 15(B), when the aperture blade 733 exists within the opening 731 of the shutter unit 730, that is, when the aperture blade 733 is in the non-withdrawal position, even if it is intended that the second group lens 202 comes into the opening 731 of the shutter unit 730 in accordance with a malfunction of the lens control system or a mechanical shock in operation, the engagement rod 729 in the side of the lens unit 260 is in contact with the plate member 733b of the aperture blade 733 to prohibit further approach of the shutter unit 730 to the second group lens 202, before the second group lens 202 is in contact with the aperture blade 733. Thus, there is no possibility that the second group lens 202 is in contact with the aperture blade 733, and thus it is possible to reduce the collapse length while making sure of the reliability of the structural strength.

According to the fourth embodiment, the aperture blade 733 is provided wit the control section. However, it is acceptable that the control section is provided on the shutter blade or a member operating together with the shutter blade.

Next, there will be explained the fifth embodiment. All of the first to fourth embodiments relate to one in which the present invention is applied to a digital camera. However, it is noted that the present invention is applicable to any type of camera that photography is carried out on a silver halide film, not restricted to the digital camera. But in this case, at the time of the collapse, the aperture and the like become the open state, and thus there is a need to provide such an arrangement that no light is incident onto the silver halide film at the time of the collapse.

Figure 16:
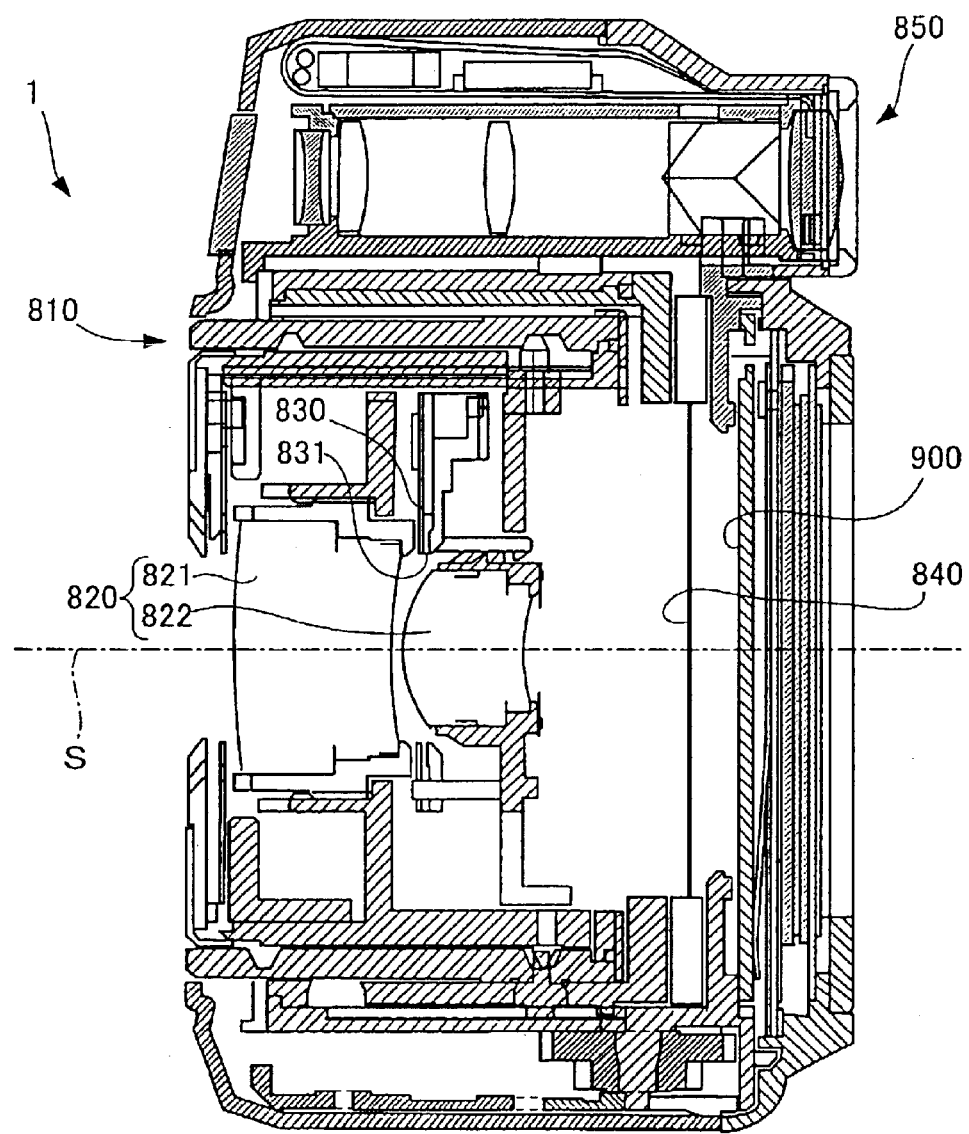
FIG. 16 is a sectional view of a fifth embodiment, in which the present invention is applied to a camera wherein photography is performed on a silver halide film, taken along an optical axis.

FIG. 16 is a sectional view of a fifth embodiment, in which the present invention is applied to a camera wherein photography is performed on a silver halide film, taken along an optical axis.

According to the present embodiment, there is shown only the collapsed state, and only the aspect of the present invention will be explained.

The camera 1 is provided with an image taking lens 820 consisting of a first group lens 821 and a second group lens 822 in a collanse and extension type of lens barrel 810. Inside the lens barrel 810, there is disposed an aperture unit 830 between the first group lens 821 and the second group lens 822. While the aperture unit 830 is not restricted in the structure, it is assumed that the aperture unit 830 has the same structure as those of FIG. 10 and FIGS. 11(A) and 11(B). The aperture unit 830 is in the withdrawal state that the aperture blade 34 (cf. FIGS. 11(A) and 11(B)) moves to the withdrawal position shown in FIG. 11(A), in the collapsed state shown in FIG. 16. In case of the camera shown in FIG. 16, the top of the second group lens 822 comes into an opening 831 of the aperture unit 830 in the withdrawal state.

The camera 1 is such types of camera that photography is carried out on a silver halide film 900 and is provided with a focal plane shutter 840, which covers the front of the silver halide film 900 to shield the light and open only at the time of photography, after the lens barrel 810, so that it does not happen that the light is projected onto the silver halide film 900, for example, when the lens barrel 810 is in the collapsed state as shown in FIG. 16, other than the photographic time.

The camera 1 is provided with an optical finder 850 on the top.

According to the embodiment shown in FIG. 16, there is concerned with such types of camera that photography is carried out on a silver halide film. The camera is provided with the focal plane shutter, so that it does not happen that the light is projected onto the silver halide film, for example, when the lens barrel is in the collapsed state, other than the photographic time. It is noted, however, that replacement of the focal plane shutter by a lens barrier having shielding ability or a front cover makes it possible to prevent the light from projecting onto the silver halide film. In this case, instead of the aperture unit 830, a unit having a blade for both aperture blade and shutter blade is disposed and there is provided a mechanism for forcibly withdrawing the blade for both aperture blade and shutter blade to the withdrawal position. Further, it is desired to provide a mechanical coupling mechanism in such a manner that the lens barrier or the front cover are closed before the blade for both aperture blade and shutter blade opens even if malfunction of the lens control system or a mechanical shock in operation occur.

Further, according to the above-mentioned embodiments, the present invention is applied to a collapse type of camera. However, there is no need that the present invention is of a type in which the lend barrel always completely collapses, and any one is acceptable, as the camera, which is provided with a lens barrel variable in barrel length between the storage state relatively short in the barrel length and the photographic state relatively long in the barrel length.

Still further, while the above-mentioned embodiments are concerned with a camera provided with a lens barrel as the embodiments of the present invention, the present invention is applicable also to the lens barrel per se in single use such as an interchangeable lens and the like.

As mentioned above, according to the present invention, it is possible to provide a lens barrel short in a barrel length capable of reducing a size in an optical axis direction in a storage state of the lens barrel, and also to provide a thin type of camera excellent in portability.

While the present invention has been described with reference to the particular illustrative embodiments, it is not to be restricted by those embodiments but only by the appended claims. It is to be appreciated that those skilled in the art can change or modify the embodiments without departing from the scope and sprit of the present invention.

What is claimed is:

1. A lens barrel which is variable in barrel length between a storage state having a relatively short barrel length and an image taking state having a relatively long barrel length, wherein the lens barrel incorporates therein an image taking lens formed of a plurality of lens groups, the lens barrel comprising:
    a light quantity control member having a use state such that a light quantity of a photographic light passing through the image taking lens is controlled when the lens barrel is in the image taking state, and having a non-use state such that an opening is kept a predetermined aperture size when the lens barrel is in the storage state;
    a lens movement mechanism that moves at least one of members that consitute a lens group of the plurality of lens groups constituting the image taking lens to a state such that at least a portion of said member enters into the opening of the light quantity control member when the lens barrel moves from the image taking state to the storage state; and
    a compulsory changing over member that, when the lens movement mechanism moves at least one of said members, forcibly changes over the light quantity control member to the non-use state by mechanically engaging with the light quantity control member before said portion comes into contact with the light quantity control member by an operation of the lens movement mechanism;
wherein
    the compulsory changing over member keeps engaging with the light quantity control member in the storage state so as to maintain the light quantity control member in the non-use state while the lens barrel is in the storage state.

2. A lens barrel according to claim 1, wherein the light quantity control member is a lens shutter.

3. A lens barrel according to claim 1, wherein the light quantity control member is an aperture member.

4. A lens barrel according to claim 1, wherein when the light quantity control member is in the non-use state, the light quantity control member maintains the opening such that the opening is opened more than a maximum aperture of the opening in the use state.

5. A lens barrel according to claim 1, wherein the lens barrel further comprises control means that maintains the non-use state wherein the light quantity control member withdraws to a predetermined withdrawal position when the lens barrel is in the storage state, and the light quality control member controls an approach of the lens groups to the light quantity control member in an optical axis direction when the light quantity control member is in a non-withdrawal position.

6. A lens barrel according to claim 5, wherein the control means comprises an engagement member provided on a side of the lens groups, and a control member that comes into a movement path for the engagement member from out of the movement path in connection with a movement of the light quantity control member from the withdrawal position to the non-withdrawal position, and the control member is constructed in a manner such that, before at least part of the lens groups is in contact with the light quantity control member at the non-withdrawal position, the control member is in contact with the engagement member so as to prevent contact of the part with the light quantity control member.

7. A lens barrel according to claim 6, wherein the light quantity control member consists of an aperture blade, and the control member is constructed in united body with the aperture blade.

8. A camera having a lens barrel that is variable in barrel length between a storage state having a relatively short barrel length and an image taking state having a relatively long barrel length, the lens barrel incorporating therein an image taking lens that includes a plurality of lens groups, the lens barrel comprising:
    a light quantity control member;
    having a use state such that a light quantity of a photographic light passing through the image taking lens is controlled when the lens barrel is in the image taking state, and having a non-use state such that an opening is kept a predetermined aperture size when the lens barrel is in the storage state;
    a lens movement mechanism that moves at least one of members that consitute a lens group of the plurality of lens groups constituting the image taking lens to a state such that at least a portion of said member enters into the opening of the light quantity control member when the lens barrel state is changed from the image taking state to the storage state; and
    a compulsory changing over member that, when the lens movement mechanism moves at least one of said members, forcibly changes over the light quantity control member to the non-use state by mechanically engaging with the light quantity control member before said portion comes in contact with the light quantity control member by an operation of the lens movement mechanism;

wherein
photography is carried out by a photographic light passing through the opening in the light quantity control member; and;

the compulsory changing over member keeps engaging with the light quantity control member in the storage state so as to maintain the light quantity control member in the non-use state while the lens barrel is in the storage state.

9. A camera according to claim 8, wherein the light quantity control member is a lens shutter.

10. A camera according to claim 8, wherein the light quantity control member is an aperture member.

11. A camera according to claim 8, wherein when the lens barrel is in the storage state, the light quantity control member maintains the opening in the non-use state such that the opening is opened more than a maximum aperture of the opening in the image taking state.

12. A camera according to claim 8, wherein the compulsory changing over member is a rod-like shaped member projecting toward the light quantity control member provided on a side of the lens groups, and the light quantity control member is in contact with the compulsory changing over member, before the part is in contact with the light quantity control member, when the lens barrel moves from the image taking state to the storage state, so that the light quantity control member changes over to the non-use state upon receipt of a driving force wherein the lens barrel moves to the storage state, via the compulsory changing over member.

13. A camera according to claim 8, wherein the lens barrel further comprises control means that maintains the non-use state wherein the light quantity control member withdraws to a withdrawal position wherein it is permitted that at least part of members constituting any lens group of the plurality of lens groups constituting the image taking lens comes into the opening of the light quantity control member, when the lens barrel is in the storage state, and controls an approach of the lens groups to the light quantity control member in an optical axis direction, when the light quantity control member is in a non-withdrawal position.

14. A camera according to claim 13, wherein the control means comprises an engagement member provided on a side of the lens groups, and a control member that comes into a movement path for the engagement member from out of the movement path in connection with a movement of the light quantity control member from the withdrawal position to the non-withdrawal position, and the control member is constructed in such a manner that before at least part of the lens groups is in contact with the light quantity control member at the non-withdrawal position, the control member is in contact with the engagement member to prevent contact of the part with the light quantity control member.

15. A camera according to claim 14, wherein the light quantity control member consists of an aperture blade, and the control member is constructed in united body with the aperture blade.

16. A camera according to claim 8, and further comprising, in addition to the light quantity control member that constitutes a first light quantity control member:

a second light quantity control member that is freely opened and closed so as to shield a photographic light passing through the lens barrel in a closed state, wherein the second light quantity control member is kept in the closed state when the lens barrel is in the storage state.

* * * * *